United States Patent
Wang

(10) Patent No.: US 11,937,294 B2
(45) Date of Patent: Mar. 19, 2024

(54) COMMUNICATION METHOD, APPARATUS, COMPUTER-READABLE MEDIUM AND ELECTRONIC DEVICE

(71) Applicant: Tencent Technology (Shenzhen) Company Limited, Guangdong (CN)

(72) Inventor: Tao Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 401 days.

(21) Appl. No.: 17/329,851

(22) Filed: May 25, 2021

(65) Prior Publication Data
US 2021/0282183 A1    Sep. 9, 2021

Related U.S. Application Data

(63) Continuation of application No. PCT/CN2020/100401, filed on Jul. 6, 2020.

(30) Foreign Application Priority Data

Jul. 12, 2019 (CN) .......................... 201910628398.6

(51) Int. Cl.
*H04W 74/08* (2009.01)
*H04W 72/566* (2023.01)
*H04W 74/00* (2009.01)

(52) U.S. Cl.
CPC ......... *H04W 74/08* (2013.01); *H04W 72/569* (2023.01); *H04W 74/006* (2013.01)

(58) Field of Classification Search
CPC . H04W 74/08; H04W 72/569; H04W 74/006; H04W 84/12; H04W 74/02
See application file for complete search history.

(56) References Cited

U.S. PATENT DOCUMENTS

| 8,619,786 B2 | 12/2013 | Wentink |
| 9,681,377 B2 | 6/2017 | Sammour et al. |

(Continued)

FOREIGN PATENT DOCUMENTS

| CN | 103634925 A | 3/2014 |
| CN | 103944671 A | 7/2014 |

(Continued)

OTHER PUBLICATIONS

Search Report for corresponding application No. CN 2019106283986 dated Dec. 8, 2021, in Chinese language, 2p.

(Continued)

*Primary Examiner* — Dinh Nguyen
(74) *Attorney, Agent, or Firm* — Crowell & Moring LLP

(57) ABSTRACT

Embodiments of this disclosure provide a communication method and apparatus, a computer-readable medium, and an electronic device. The communication method includes: generating a wireless communication message frame, the wireless communication message frame including information about devices in a queue to access a channel, and an access order of the devices; and transmitting, when information about an available transmission channel is obtained, the wireless communication message frame to start a data transmission procedure and instruct the devices to sequentially transmit communication data through the transmission channel according to the access order in the data transmission procedure. In the technical solutions of the embodiments of this disclosure, channel utilization and communication efficiency between devices can be improved.

19 Claims, 11 Drawing Sheets

(56) References Cited

U.S. PATENT DOCUMENTS

| | | | |
|---|---|---|---|
| 9,912,395 | B2 | 3/2018 | Wentink |
| 10,484,925 | B1* | 11/2019 | Chen .................. H04W 40/16 |
| 11,082,167 | B2* | 8/2021 | Wang .................. H04L 1/1614 |
| 2007/0147284 | A1 | 6/2007 | Sammour et al. |
| 2011/0261742 | A1 | 10/2011 | Wentink |
| 2012/0063433 | A1 | 3/2012 | Wentink |
| 2013/0064161 | A1* | 3/2013 | Hedayat ............... H04W 8/186 |
| | | | 370/312 |
| 2015/0124690 | A1* | 5/2015 | Merlin ................. H04W 72/30 |
| | | | 370/312 |
| 2015/0156791 | A1 | 6/2015 | Wu et al. |
| 2016/0112986 | A1* | 4/2016 | Patil .................... H04W 68/02 |
| | | | 455/515 |
| 2020/0059973 | A1 | 2/2020 | Ahn et al. |

FOREIGN PATENT DOCUMENTS

| | | |
|---|---|---|
| CN | 104579616 A | 4/2015 |
| CN | 105263192 A | 1/2016 |
| CN | 107637005 A | 1/2018 |
| CN | 108155975 A | 6/2018 |
| CN | 109151957 A | 1/2019 |
| CN | 110381601 A | 10/2019 |
| JP | 2013-540405 A | 10/2013 |
| JP | 2014-207693 A | 10/2014 |
| JP | 2016-174430 A | 9/2016 |
| WO | WO 2012/054292 A1 | 4/2012 |
| WO | WO 2018/222177 A1 | 12/2018 |
| WO | WO 2021/008401 A1 | 1/2021 |

OTHER PUBLICATIONS

First Office Action for corresponding application No. CN 201910628398.6 dated Dec. 14, 2021, in Chinese language, 6p.
Concise Explanation of Relevance for B6 and B7.
Notice of Reasons for Refusal for corresponding application No. JP 2021-552181 dated Sep. 14, 2022, 6p, in Japanese language.
English language translation of Notice of Reasons for Refusal for corresponding application No. JP 2021-552181 dated Sep. 14, 2022, 6p.
Second Office Action and Search Report for corresponding application No. CN 201910628398.6 dated Jun. 13, 2022, 6p, in Chinese language.
Search Report for corresponding application No. CN 201910628398.6 dated Jun. 7, 2022, 2p, in Chinese language.
Concise Explanation of Relevance for C2 and C3.
Extended European Search Report for European application No. 20839715.8 dated Jul. 11, 2022, 8p.
International Search Report and Written Opinion for priority application No. PCT/CN2020/100401 dated Sep. 28, 2020, 10p.
English Translation of International Search Report for priority application No. PCT/CN2020/100401 dated Sep. 28, 2020, 2p.
"NR numerology and frame structure for unlicensed bands", 3GPP TSG RAN WG1 Huawei, HiSilicon Meeting #94bis, R1-1810123, dated Oct. 12, 2018, 14p, China
Concise Explanation of Relevance of the International Written Opinion for priority application No. PCT/CN2020/100401 dated Sep. 28, 2020, 1p.

* cited by examiner

COMMUNICATION METHOD, APPARATUS, COMPUTER-READABLE MEDIUM AND ELECTRONIC DEVICE

RELATED APPLICATIONS

This application is a continuation of PCT Patent Application No. PCT/CN2020/100401, entitled "COMMUNICATION METHOD, APPARATUS, COMPUTER-READABLE MEDIUM AND ELECTRONIC DEVICE" and filed with the National Intellectual Property Administration, PRC on Jul. 6, 2020, which claims priority to Chinese Patent Application No. 201910628398.6, entitled "COMMUNICATION METHOD AND APPARATUS, COMPUTER-READABLE MEDIUM, AND ELECTRONIC DEVICE" and filed with the National Intellectual Property Administration, PRC on Jul. 12, 2019. The above applications are incorporated herein by reference in their entireties.

TECHNICAL FIELD

This application relates to the field of computer and communication technologies, and specifically, to a communication method and apparatus, a computer-readable medium, and an electronic device.

BACKGROUND

With the development of Internet technologies, many services and applications have increasingly high requirements on aspects such as throughput and latency of a radio access network (for example, a wireless local area network). In addition, because the wireless local area network standard IEEE 802.11 is backward compatible, with iterative updates of the standard, IEEE 802.11a/b/g/n/ac/ax and the next generation IEEE 802.11be share the same frequency bands (for example, a 2.4 GHz frequency band and a 5 GHz frequency band), resulting in increasingly severe spectrum congestion. In view of this problem, how to ensure channel utilization to improve communication efficiency of a system becomes a technical problem to be resolved urgently.

SUMMARY

Embodiments of this disclosure provide a communication method and apparatus, a computer-readable medium, and an electronic device, to improve channel utilization and communication efficiency between devices at least to some extent.

Other features and advantages of this application become obvious through the following detailed descriptions, or may be partially learned through the practice of this application.

According to an aspect of the embodiments of this disclosure, a communication method is provided, performed by an electronic device, the method including: generating a wireless communication message frame, the wireless communication message frame including information about devices in a queue to access a channel, and an access order of the devices; and transmitting, when information about an available transmission channel is obtained, the wireless communication message frame to start a data transmission procedure and instructing the devices to sequentially transmit communication data through the transmission channel according to the access order in the data transmission procedure.

According to an aspect of the embodiments of this disclosure, a communication method is provided, performed by an electronic device, the method including: receiving a wireless communication message frame, the wireless communication message frame including information about devices in a queue to access a specified transmission channel, and an access order of the devices; listening on the specified transmission channel if the wireless communication message frame includes information about a specified device; and transmitting, by the specified device, communication data through the specified transmission channel in a case of detecting, on the specified transmission channel, that data transmission of a previous device of the specified device in the access order is completed and detecting that the specified transmission channel is idle.

According to an aspect of the embodiments of this disclosure, a communication apparatus is provided, including: a generation unit, configured to generate a wireless communication message frame, the wireless communication message frame including information about devices in a queue to access a channel, and an access order of the devices; and a transmission unit, configured to transmit, if information about an available transmission channel is obtained, the wireless communication message frame to start a data transmission procedure and instruct the devices to sequentially transmit communication data through the transmission channel according to the access order in the data transmission procedure.

According to an aspect of the embodiments of this disclosure, a communication apparatus is provided, including: a receiving unit, configured to receive a wireless communication message frame, the wireless communication message frame including information about devices in a queue to access a specified transmission channel, and an access order of the devices; a listening unit, configured to listen on the specified transmission channel if the wireless communication message frame includes information about a specified device; and a transmission unit, configured to transmit, by the specified device, communication data through the specified transmission channel in a case of detecting, on the specified transmission channel, that data transmission of a previous device of the specified device in the access order is completed and detecting that the specified transmission channel is idle.

According to an aspect of the embodiments of this disclosure, a non-transitory computer-readable medium is provided, storing a computer program, the computer program, when executed by a processor, implementing the communication method according to the foregoing embodiments.

According to an aspect of the embodiments of this disclosure, an electronic device is provided, including: one or more processors; and a storage apparatus, configured to store one or more programs, the one or more programs, when executed by the one or more processors, causing the one or more processors to implement the communication method according to the foregoing embodiments.

In some embodiments of this disclosure, a wireless communication message frame including information about devices in a queue to access a channel and an access order of the devices is generated, if information about an available transmission channel is obtained, the wireless communication message frame is transmitted to start a data transmission procedure and instruct the devices to sequentially transmit communication data through the transmission channel according to the access order in the data transmission procedure. In this way, after the available transmission channel is obtained, the devices can sequentially transmit data based on the transmission channel, which avoids increase of signaling overheads caused because all the devices need to perform channel contention to transmit data, and achieves a more proper multi-device channel access control policy, thereby improving channel utilization and communication efficiency between devices.

In some embodiments of this disclosure, a wireless communication message frame including information about devices in a queue to access a specified transmission channel and an access order of the devices is received, the specified transmission channel is listened on if the wireless communication message frame includes information about a specified device, and the specified device transmits communication data through the specified transmission channel in a case of detecting, on the specified transmission channel, that data transmission of a previous device of the specified device in the access order is completed and detecting that the specified transmission channel is idle. On the one hand, increase of signaling overheads caused because all the devices need to perform channel contention to transmit data can be avoided; on the other hand, the devices can transmit data through the specified transmission channel in a proper and orderly manner, thereby helping improve channel utilization and communication efficiency between devices.

It is to be understood that the foregoing general description and the following detailed description are merely for illustration and explanation purposes and are not intended to limit this application.

BRIEF DESCRIPTION OF THE DRAWINGS

Accompanying drawings herein are incorporated into a specification and constitute a part of this specification, show embodiments that conform to this application, and are used for describing a principle of this application together with this specification. Obviously, the accompanying drawings in the following descriptions are merely some embodiments of this disclosure, and a person of ordinary skill in the art may further obtain other accompanying drawings according to the accompanying drawings without creative efforts. In the accompanying drawings.

DESCRIPTION OF EMBODIMENTS

The exemplary implementations are now described comprehensively with reference to the accompanying drawings. However, the exemplary embodiments can be implemented in various forms and are not construed as being limited to the examples herein. Conversely, such implementations are provided to make this application more comprehensive and complete, and fully convey the concepts of the exemplary implementations to a person skilled in the art.

In addition, the described characteristics, structures, or features may be combined in one or more embodiments in any appropriate manner. In the following descriptions, a lot of specific details are provided to give a comprehensive understanding of the embodiments of this disclosure. However, a person of ordinary skill in the art is to be aware that, the technical solutions in this application may be implemented without one or more of the particular details, or another method, unit, apparatus, or step may be used. In other cases, well-known methods, apparatuses, implementations, or operations are not shown or described in detail, to avoid obscuring the aspects of this application.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual case.

Figure 1:
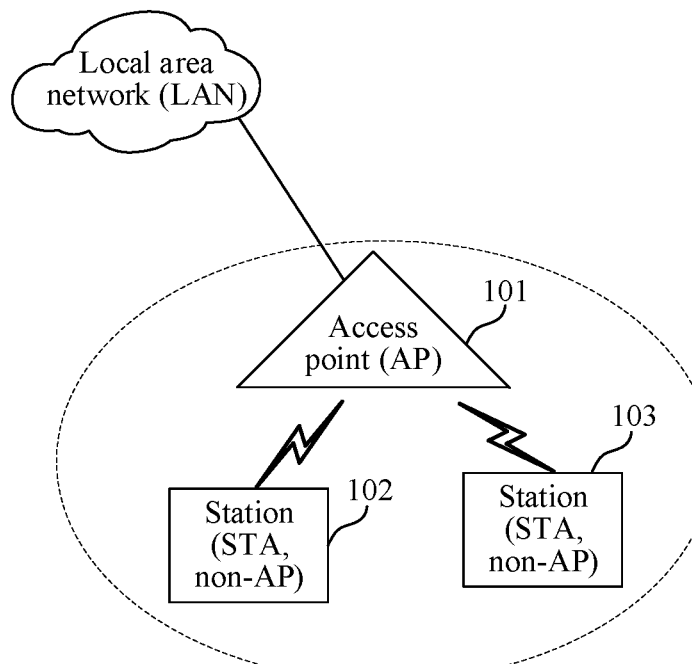
FIG. 1 is a schematic diagram of an exemplary system architecture according to an embodiment of this disclosure is applicable.

FIG. 1 is a schematic diagram of an exemplary system architecture according to an embodiment of this disclosure is applicable.

As shown in FIG. 1, the system architecture may include an AP 101, a STA (non-AP) 102, and a STA 103. The AP 101, the STA 102, and the STA 103 form a local area network (LAN). The STA may be a smartphone, a tablet computer, a portable computer, a desktop computer, or the like.

It is to be understood that quantities of APs and STAs shown in FIG. 1 are merely an example. There may be any quantities of APs and STAs according to an actual requirement.

In an embodiment of this disclosure, the AP 101 may generate a wireless communication message frame. The wireless communication message frame may be a trigger frame, and the wireless communication message frame includes information about devices in a queue to access a channel, and an access order of the devices. After obtaining information about an available transmission channel, the AP 101 may transmit the wireless communication message frame to start a data transmission procedure and instruct the devices included in the wireless communication message frame to sequentially transmit communication data through the transmission channel according to the access order in the data transmission procedure.

For example, if the wireless communication message frame includes information about the STA 102 and the STA 103, in which the access order of the STA 102 is preceding the STA 103, after obtaining the information about the available transmission channel by the AP 101, the AP 101 may transmit the wireless communication message frame. After receiving the wireless communication message frame, the STA 102 may obtain the information about the transmission channel according to the wireless communication message frame, and may transmit communication data through the transmission channel after detecting that the channel is idle. After receiving the wireless communication message frame, the STA 103 may learn, according to the wireless communication message frame, that the STA 103 cannot transmit data through the transmission channel until the STA 102 transmits the data. Therefore, the STA 103 may listen on the transmission channel. When detecting that the data transmission of the STA 102 is completed and detecting that the transmission channel is idle, the STA 103 may transmit data through the transmission channel. It may be learned that in the technical solutions of the embodiments of this disclosure, on the one hand, it can avoid increase of signaling overheads when all the devices need to perform channel contention to transmit data; on the other hand, the devices can transmit data through the specified transmission channel in a proper and orderly manner, thereby helping improve channel utilization and communication efficiency between devices.

The implementation details of the embodiments of this disclosure are described below in detail.

Figure 2:
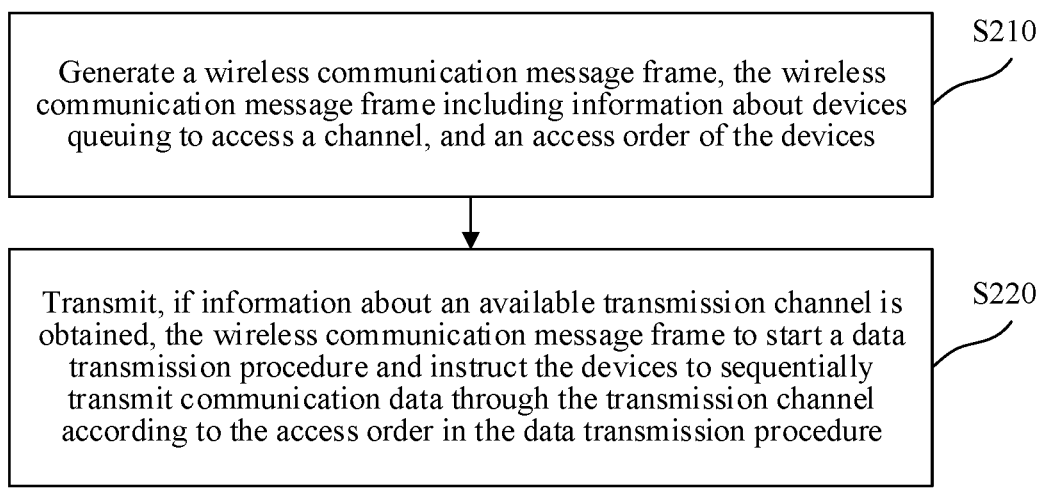
FIG. 2 is a flowchart of a communication method according to an embodiment of this disclosure.

FIG. 2 is a flowchart of a communication method according to an embodiment of this disclosure. The communication method may be performed by an AP device, for example, may be performed by the AP 101 in FIG. 1. Referring to FIG. 2, the communication method includes at least step S210 and step S220. A detailed description is as follows:

Step S210. Generate a wireless communication message frame, the wireless communication message frame including information about devices in a queue to access a channel, and an access order of the devices.

In an embodiment of this disclosure, the wireless communication message frame may be a trigger frame. The devices in a queue to access a channel may include a STA device in a queues to access a channel to transmit data, and may include an AP device in a queues to access a channel to transmit data.

Figure 3:
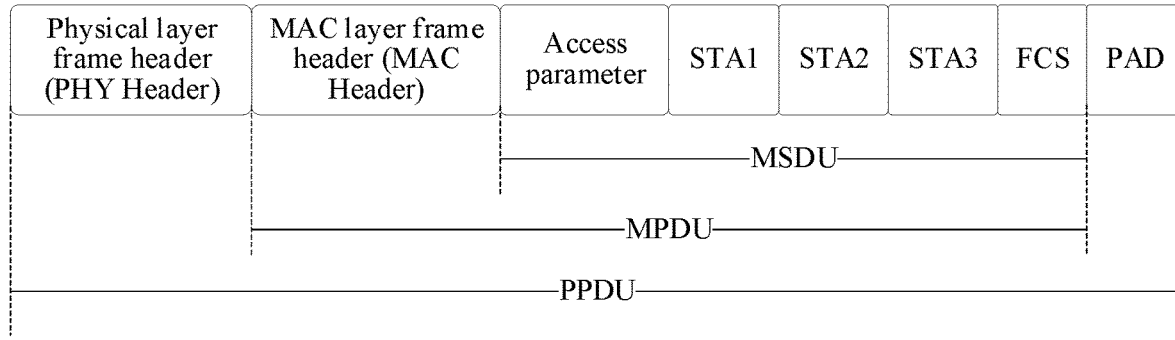
FIG. 3 is a structural diagram of a wireless communication message frame according to an embodiment of this disclosure.

In an embodiment of this disclosure, as shown in FIG. 3, the wireless communication message frame may be a presentation protocol data unit (PPDU). The PPDU is a data frame formed by adding a physical layer frame header (PHY Header) and a PAD (padding) bit based on a media access control (MAC) protocol data unit (MPDU). The MPDU is a data frame formed by adding a MAC layer frame header (MAC Header) based on a MAC service data unit (MSDU). The MSDU includes access parameter information, a frame check sequence (FCS), and the information (a STA1, a STA2, and a STA3 shown in FIG. 3) of the devices in a queue to access a channel. An arrangement order of the information about the devices represents the access order of the devices. As shown in FIG. 3, the access order of the STA1 is located before that of the STA2, and the access order of the STA2 is located before that of the STA3.

Figure 4:
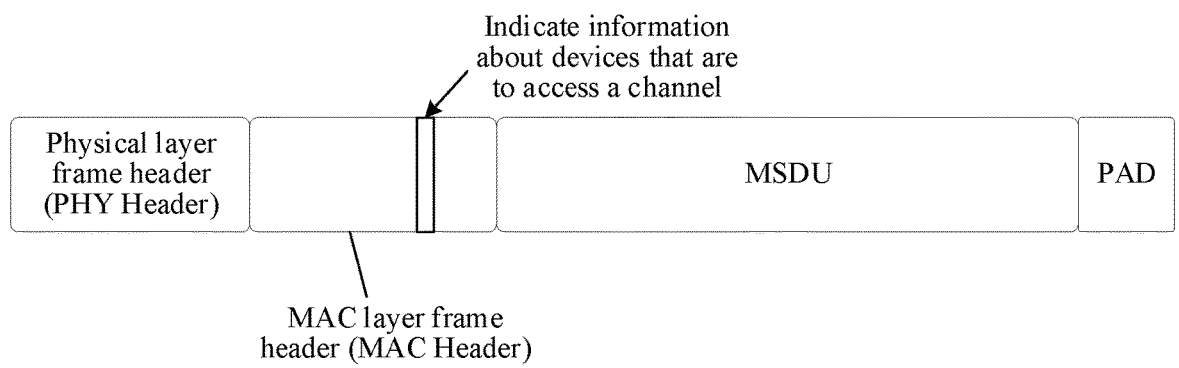
FIG. 4 is a structural diagram of a wireless communication message frame according to an embodiment of this disclosure.

In an embodiment of this disclosure, as shown in FIG. 4, the wireless communication message frame may be a PPDU. The information about the devices in a queue to access a channel and information about the access order of the devices may be added to a MAC layer frame header part of the wireless communication message frame. The information about the access order of the devices may alternatively be represented by an arrangement order of the information about the devices. In another embodiment of this disclosure, the information about the devices in a queue to access a channel and the information about the access order of the devices may alternatively be added to a PHY layer frame header part of the wireless communication message frame.

In an embodiment of this disclosure, the wireless communication message frame may further include first indication information. The first indication information is used for indicating that priorities of data frames transmitted by the devices in the data transmission procedure are greater or equal to a specified priority. That is, the first indication information included in the wireless communication message frame is used for indicating information about a service priority, and the priorities of the data frames transmitted by the devices in the data transmission procedure may be greater or equal to the service priority indicated in the first indication information.

In an embodiment of this disclosure, the wireless communication message frame may further include a maximum time period of the data transmission procedure, or may further include fourth indication information used for indicating a modulation and coding scheme (MCS) adopted in data transmission.

Still referring to FIG. 2's step S220. Transmit, if information about an available transmission channel is obtained, the wireless communication message frame to start a data transmission procedure and instruct the devices to sequentially transmit communication data through the transmission channel according to the access order in the data transmission procedure.

In an embodiment of this disclosure, the AP device may obtain the information about the available transmission channel through channel contention, or the AP device may perform communication negotiation with another AP device to obtain the information about the available transmission channel.

In an embodiment of this disclosure, each device included in the wireless communication message frame may transmit communication data through the transmission channel after detecting that data transmission of a previous device is completed and when detecting that the transmission channel is idle.

In an embodiment of this disclosure, after transmitting the wireless communication message frame, the AP device may transmit a message frame for ending the data transmission procedure when detecting that data transmission of the last device in the access order is completed. The message frame may include at least a field, to indicate that the current data transmission procedure is ended.

In an embodiment of this disclosure, in a process that the devices sequentially transmit communication data, a device may fail to transmit communication data due to a problem of communication. In this case, the message frame for ending the data transmission procedure may also be transmitted in time. Specifically, the message frame for ending the data transmission procedure may be transmitted within a transmission time of a target device included in the wireless communication message frame if no communication data transmitted by the target device is detected in a first preset time period. When transmitting the wireless communication message frame, the AP device may determine an access order and an allowable transmission time period of devices in a group corresponding to the wireless communication message frame. For example, the first preset time period starts from a moment at which the AP device detects that communication data (data frame) transmission of a previous device of the target device is completed. When the target device is the first device in the group, for example, the first preset time period starts after the AP device transmits the wireless communication message frame.

In an embodiment of this disclosure, after the message frame for ending the data transmission procedure is transmitted, a new wireless communication message frame may be generated, a data transmission time period indicated in the new wireless communication message frame being less than or equal to a remaining transmission time period of the ended data transmission procedure. According to this embodiment of this disclosure, requirements at different levels may be met by using the remaining transmission time period. For example, when there are fewer grouped devices and a required communication time period is short, the "remaining transmission time period" may be used for meeting communication requirements, to improve utilization of an air interface.

In an embodiment of this disclosure, if it is detected that there is interference between communication data transmitted by a first device and a second device in a data transmission process, a data transmission procedure including the second device or the first device may not be started in a second preset time period. In this embodiment, the data transmission procedure including the second device or the first device is not started in the second preset time period, which can prevent continuous interference between the first device and the second device from affecting data transmission. For example, the second preset time period starts from a moment at which the AP device detects that the later of data transmission of the first device and data transmission of the second device between which interference occurs is completed.

In an embodiment of this disclosure, if it is detected that there is interference between communication data transmitted by a first device and a second device in a data transmission process, a data transmission procedure for the second device may be started on another transmission channel different from a transmission channel of the first device. In this embodiment, the data transmission procedure for the second device is started on another transmission channel different from the transmission channel of the first device, which can prevent interference between the first device and the second device on the same transmission channel from affecting data transmission.

In an embodiment of this disclosure, the wireless communication message frame may further include second indication information and third indication information, the second indication information being used for indicating that priorities of data frames transmitted by the devices in the data transmission procedure are equal to a specified priority, and the third indication information being used for indicating whether service data higher than the specified priority is allowed to be transmitted in the data transmission procedure. If the third indication information indicates that target service data higher than the specified priority is allowed to be transmitted in the data transmission procedure, the target service data is allowed to be transmitted on the transmission channel after data transmission of the last device in the access order is completed. In this embodiment, it may be ensured that high-priority service data is transmitted in time while an original data transmission service is performed normally.

In an embodiment of this disclosure, a message frame for ending the data transmission procedure is transmitted in a case of detecting that transmission of the target service data is completed on the transmission channel.

In another embodiment of this disclosure, a message frame for ending the data transmission procedure is transmitted if the third indication information indicates that the target service data higher than the specified priority is allowed to be transmitted in the data transmission procedure but the target service data is not received in a third preset time period after the data transmission of the last device is completed.

In an embodiment of this disclosure, a message frame for ending the data transmission procedure is transmitted if the third indication information indicates that the target service data higher than the specified priority is allowed to be transmitted in the data transmission procedure but target service data transmitted by a plurality of other devices on the transmission channel is detected after the data transmission of the last device is completed. In this embodiment, when the target service data transmitted by the plurality of other devices interferes with each other, the data transmission procedure can be ended in time.

In an embodiment of this disclosure, because each device included in the wireless communication message frame starts to transmit data after detecting that the data transmission of the previous device is completed, if there are hidden nodes between the devices, the data transmission procedure may be interrupted. Therefore, the embodiments of this disclosure provide a processing procedure shown in FIG. 5, which specifically includes the following steps:

Step S510. Determine, according to data transmission statuses of the devices, whether there is a hidden node of a target device in the devices.

In an embodiment of this disclosure, the target device may be any one of the devices included in the wireless communication message frame. If a device is too far away from the target device to receive data transmitted by the target device, the device may be used as a hidden node of the target device.

Step S520. Add the target device and the hidden node to different wireless communication message frames during subsequent wireless communication message frame generation if there is the hidden node of the target device.

Figure 5:
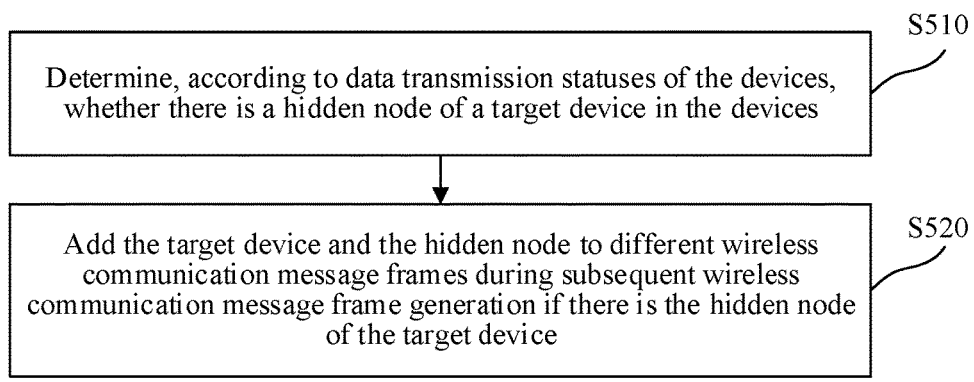
FIG. 5 is a flowchart of a communication method according to an embodiment of this disclosure.

In this embodiment shown in FIG. 5, the target device and the hidden node are added to different wireless communication message frames, which can avoid a problem of data transmission procedure interruption caused by setting devices that are hidden nodes of each other in the same data transmission procedure.

In the foregoing embodiments, the communication method of the embodiments of this disclosure is described from the perspective of an AP device. The following describes the communication method of the embodiments of this disclosure from the perspective of a STA device in detail with reference to FIG. 6.

Figure 6:
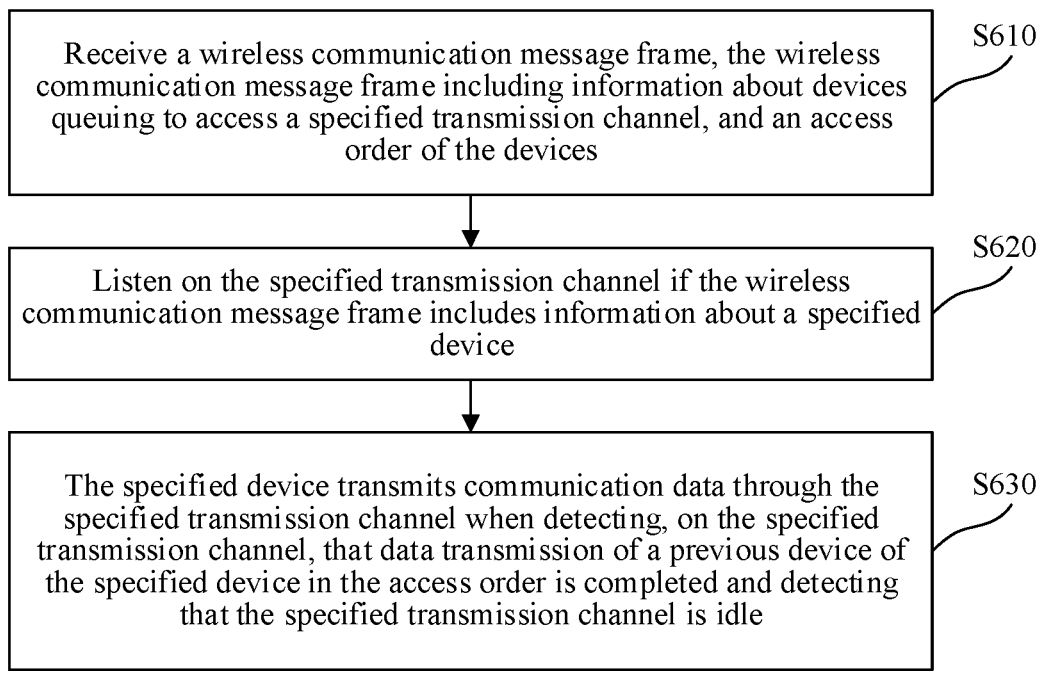
FIG. 6 is a flowchart of a communication method according to an embodiment of this disclosure.

FIG. 6 is a flowchart of a communication method according to an embodiment of this disclosure. The communication method may be performed by a device as a STA, for example, may be performed by the STA 102 or the STA 103 in FIG. 1. Referring to FIG. 6, the communication method includes at least step S610 to step S630. A detailed description is as follows:

Step S610. Receive a wireless communication message frame, the wireless communication message frame including information about devices in a queue to access a specified transmission channel, and an access order of the devices.

In an embodiment of this disclosure, the wireless communication message frame may be a trigger frame. The specified transmission channel may be an available transmission channel obtained by an AP device. The specified transmission channel may be obtained by the AP device through channel contention, or may be obtained by the AP device by performing communication negotiation with another AP device.

Step S620. Listen on the specified transmission channel if the wireless communication message frame includes information about a specified device.

In an embodiment of this disclosure, if the wireless communication message frame includes the information about the specified device, it indicates that the specified device may transmit data through the specified transmission channel. Therefore, the specified device may listen on the specified transmission channel.

Step S630. The specified device transmits communication data through the specified transmission channel in a case of detecting, on the specified transmission channel, that data transmission of a previous device of the specified device in the access order is completed and detecting that the specified transmission channel is idle.

In an embodiment of this disclosure, a device may determine, if a data frame transmitted by the previous device is detected on the specified transmission channel, that the data transmission of the previous device is completed. That is, in this embodiment, it is unnecessary for each device to listen to reception acknowledgement information for the data frame transmitted by the previous device.

In an embodiment of this disclosure, if reception acknowledgement information for the data frame transmitted by the previous device is detected on the specified transmission channel, it may be determined that the data transmission of the previous device is completed. That is, in this embodiment, it is necessary for each device to listen to the reception acknowledgement information (that is, an ACK) for the data frame transmitted by the previous device. For example, the AP replies with ACK information to a data frame transmitted by each device. In this case, when the device detects ACK information that the AP replies with to a data frame transmitted by a previous device, the device determines that data transmission of the previous device is completed. Based on this embodiment, the wireless communication message frame may further include indication information used for indicating an ACK reply policy, the policy being used for indicating that the AP replies with ACK information to the data frame transmitted by each device, and before determining whether to start transmitting a data frame, each device needs to detect ACK information for the data frame transmitted by the previous device.

In this embodiment shown in FIG. 6, on the one hand, increase of signaling overheads caused because all the devices need to perform channel contention to transmit data can be avoided; on the other hand, the devices can transmit data through the specified transmission channel in a proper and orderly manner, thereby helping improve channel utilization and communication efficiency between devices.

In the foregoing embodiments, the communication method of the embodiments of this disclosure is described from the perspectives of the AP device and the STA device. The following describes, in detail with reference to FIG. 7 to FIG. 17, the embodiments of this disclosure by using an example in which an AP schedules STAs for channel access on a 6 GHz band.

In an embodiment of this disclosure, the AP may schedule a STA group for channel access. In this case, it is unnecessary for STAs to perform channel contention, and the STAs only need to sequentially access a channel in an access order defined by the AP, to avoid increase of signaling overheads caused by channel contention between the STAs, and improve channel utilization and communication efficiency between devices.

In an embodiment of this disclosure, in APs, an available channel may be obtained through channel contention. For example, an available channel is contended for in a backoff manner of carrier-sense multiple access/collision avoidance (CSMA/CA), for example, enhanced distributed channel access (EDCA). Alternatively, an available channel may be determined through negotiation between the APs. After obtaining the available channel, the AP may transmit a trigger frame to define a time period of an entire access procedure, each STA that receives the trigger frame may set a network allocation vector (NAV) according to the indicated time period, and channel access is not allowed during a time period that is set in the NAV. For example, the time period that is set in the NAV starts from a moment at which the STA receives the trigger frame.

EDCA is a protocol for controlling channel access for wireless transmission, and allows, based on CSMA/CA, mutually compatible PHYs (Physical layers) to share a wireless medium. In a carrier sensing process, the PHY may learn, by performing physical sensing in each slot, whether the wireless medium is idle. In a random backoff process, EDCA selects a random integer value from a specific range as an initial backoff time. When the PHY senses, in a slot, that the shared medium is idle, EDCA starts performing backoff, that is, a backoff time is subtracted by 1. When the backoff time is 0, EDCA determines that channel access contention is successful, that is, a transmission opportunity (TXOP) is obtained, and start transmitting data. If the medium is detected to be busy in a slot during the backoff process, the backoff is temporarily suspended. When the medium is detected to be idle again, the backoff is continued. When backoff times of two devices are both 0, a collision occurs.

In addition, four access categories (AC) are defined in the EDCA protocol, namely, VO, VI, BE, and BK in descending order of priorities, respectively representing a voice type, a video type, a best effort type, and a background type.

In an embodiment of this disclosure, the trigger frame may be an extension of a trigger frame based on 802.1 lax, or may be a new redefined frame. The trigger frame needs to include addresses of the STAs that require access and the access order. Each STA that receives the trigger frame and is in the access order needs to keep listening on the channel, and immediately access the channel when conditions are met. Moreover, the trigger frame may include access parameters to define a maximum length, a lowest MCS, and the like for the STA to access the channel. In this case, when subsequently sending data, the STA has to comply with the access parameters defined in the trigger frame.

In an embodiment of this disclosure, a structure of the trigger frame may be shown in FIG. 3, a sequence of positions of the STA1, the STA2, and the STA3 in the MSDU representing the access order. The trigger frame may alternatively be shown in FIG. 4, STA group information being indicated in a signaling field of a frame header. The group information may include addresses and an access order of STAs in the group, and a corresponding service priority indication. Exemplarily, one STA may appear at most once in a trigger frame, and each STA can only transmit at most one PPDU, and the group information needs to include at least one STA. In this application, a difference between the PPDU transmitted by the STA and the PPDU of the trigger frame in FIG. 3 is that MSDUs (payloads of the PPDUs) are different. The MSDU in the PPDU transmitted by the STA may be specific service data.

In addition, in an embodiment of this disclosure, the group information indicated in the trigger frame may be associated with a service priority. In a group access procedure, a priority of a data frame transmitted by the STA needs to be greater than or equal to a priority corresponding to the group. For example, if a group corresponds to a service priority of VI, a STA in the group may transmit a PPDU with a priority of VI or a priority higher than VI, for example, a PPDU with a priority of VI or VO. Moreover, a STA may appear in a plurality of different access groups, and correspond to different service priorities.

Figure 7:
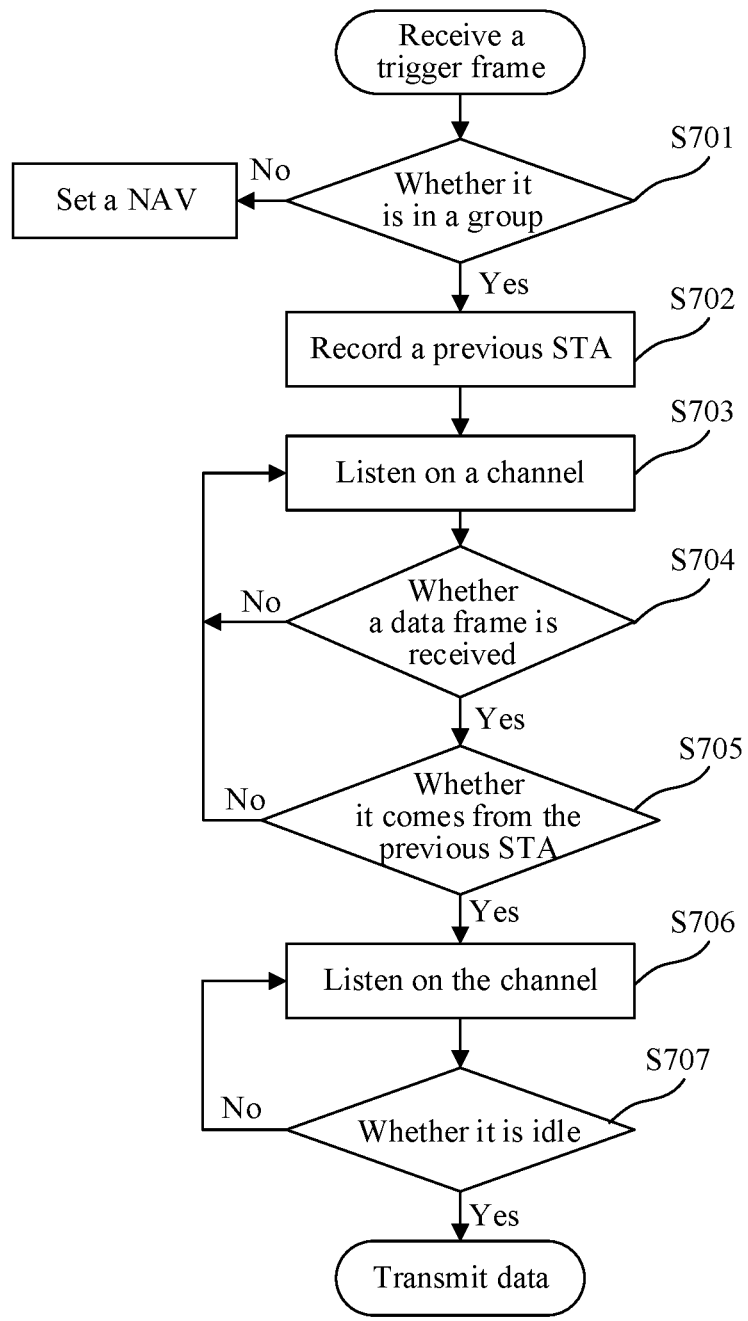
FIG. 7 is a schematic diagram of a processing procedure of a station (STA) according to an embodiment of this disclosure.

In an embodiment of this disclosure, as shown in FIG. 7, a processing procedure of a STA mainly includes the following steps:

Step S701. The STA determines, after receiving a trigger frame, whether the STA is in a group defined by the trigger frame. If yes, perform step S702, otherwise, set a NAV. The STA may determine whether the STA is in the group defined by the trigger frame by determining whether an address of the STA is included in the trigger frame. The address of the STA may be a MAC address, an association identifier (AID), and/or another identifier.

Step S702. The STA records an address of a previous STA of the STA in an access order.

Step S703. The STA listens on an access channel indicated in the trigger frame.

Step S704. The STA determines whether a data frame is received through the access channel on which the STA listens. If yes, perform step S705, otherwise, return to step S703 to continue to listen on the access channel.

Step S705. The STA determines whether the detected data frame comes from the previous STA in the access order. If yes, perform step S706, otherwise, return to step S703 to continue to listen on the access channel.

Step S706. The STA listens on the access channel indicated in the trigger frame.

Step S707. The STA determines whether the access channel is idle. If yes, transmit data through the access channel, otherwise, return to step S706 to continue to listen on whether the access channel is idle.

In an embodiment of this disclosure, after detecting that the channel changes from a busy state to a state with no signal transmission and that this state lasts for a period of time, the STA may determine that the channel is idle. The maintained period of time may be a short inter-frame space (SIFS), or another time period.

Figure 8:
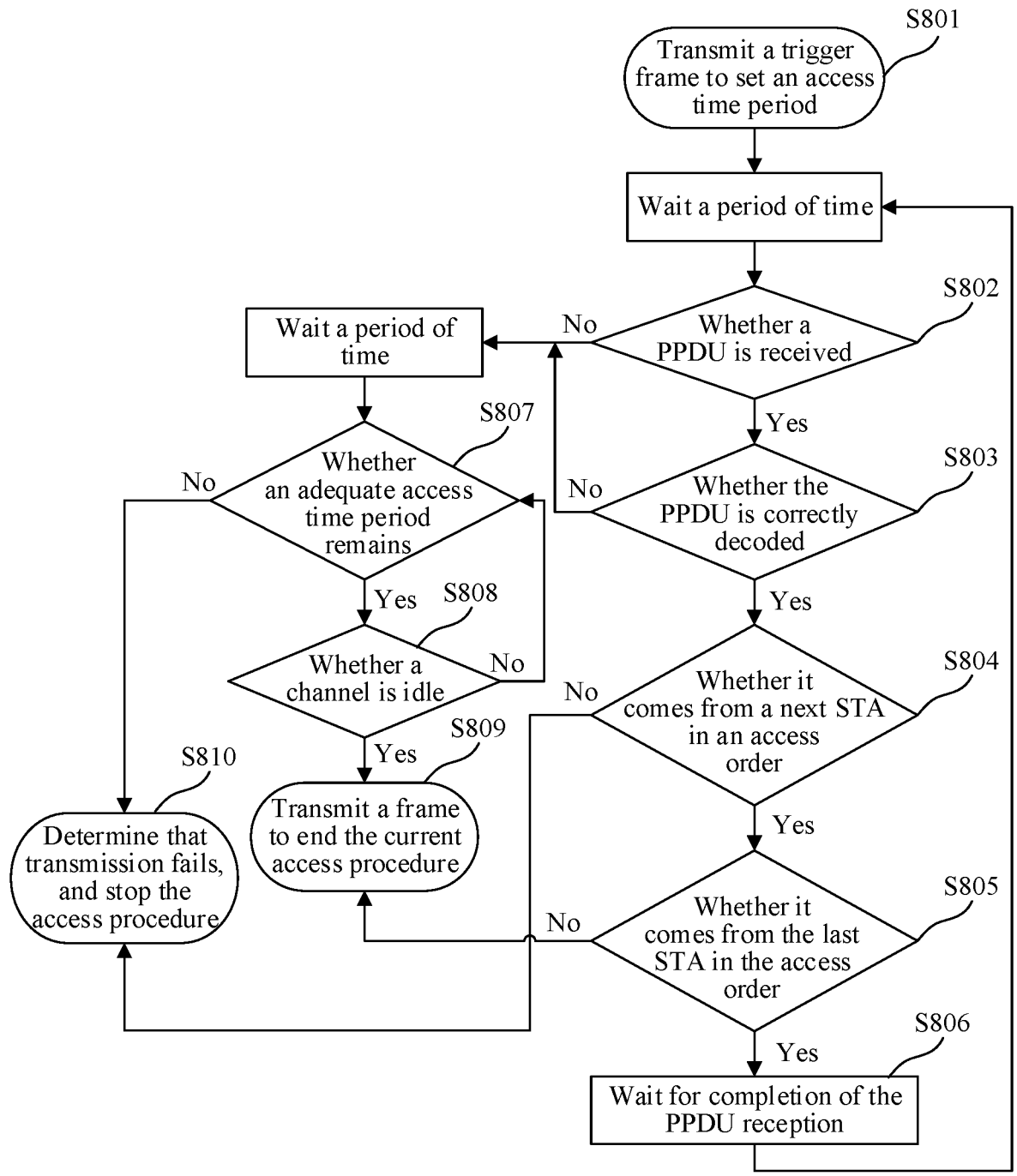
FIG. 8 is a schematic diagram of a processing procedure of an access point (AP) according to an embodiment of this disclosure.

In an embodiment of this disclosure, as shown in FIG. 8, a processing procedure of an AP mainly includes the following steps:

Step S801. The AP transmits a trigger frame, to set an access time period for a specified channel. After transmitting the trigger frame, the AP needs to keep listening on the channel to determine whether channel access is performed as planned, that is, detecting whether STAs in an access order sequentially transmit PPDUs according to the order.

Step S802. The AP determines whether a PPDU is received through the specified channel. If yes, perform step S803, otherwise, wait a period of time (which, for example, may be a SIFS) and perform step S807.

Step S803. Determine whether the received PPDU is correctly decoded. If yes, perform step S804, otherwise, wait a period of time (which, for example, may be an SIFS) and perform step S807. If a collision occurs on a STA during a data transmission process, after receiving a PPDU of the STA, the AP may not successfully decode the PPDU.

Step S804. Determine whether the received PPDU comes from a next STA in the access order. If yes, perform step S805, otherwise, perform step S810. A previous STA of the first STA in the trigger frame may be the AP transmitting the trigger frame. In this case, when receiving a PPDU the first time, the AP determines whether the received PPDU is transmitted by the first STA after the AP. For another PPDU, the AP may determine whether the received PPDU comes from a next STA of the STA from which the PPDU has been received in the access order. Step S805. Determine whether the received PPDU comes from the last STA in the access order. If yes, perform step S806, otherwise, perform step S809.

Step S806. Wait for completion of the PPDU reception, and then wait a period of time (which, for example, may be the SIFS) and return to step S802.

Step S807. Determine whether an adequate access time period remains in the access time period defined by the trigger frame. If yes, perform step S808, otherwise, perform step S810. Before transmitting the trigger frame in step S801, the AP has calculated a total time period of the current data transmission procedure, that is, the access time period, and the access time period may be included in the trigger frame. In step S807, the AP may learn a remaining access time period according to the access time period and a time period that has been used for data transmission. Then, the AP compares the remaining access time period with a sum of a time period required to transmit a message frame in step S809 and a necessary SIFS, to determine whether an adequate access time period remains.

Step S808. Determine whether the channel is idle. If yes, perform step S809, otherwise, return to step S807.

Step S809. Transmit a message frame, to end the current access procedure.

Step S810. Determine that transmission fails, and stop the access procedure.

In an embodiment of this disclosure, the AP may delete, from the current group, a STA that fails to transmit a PPDU, to ensure access efficiency of the group.

The details of the embodiments of this disclosure is described below by using an interaction process between an AP and a STA.

Figure 9:
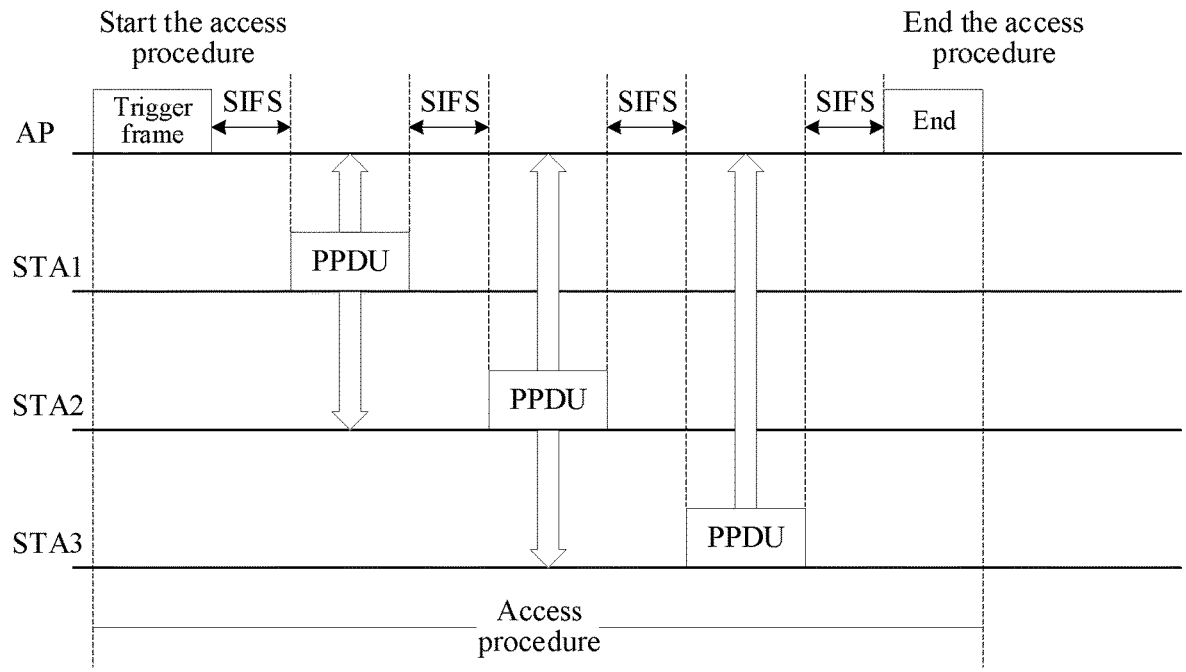
FIG. 9 is a flowchart of a process of group access according to an embodiment of this disclosure.

In an embodiment of this disclosure, as shown in FIG. 9, the AP initiates a group access procedure by transmitting a trigger frame, STAs included in the trigger frame sequentially access a channel according to an access order. For example, the access order of the STAs may be STA1-STA2-STA3. Then, after the STA1 transmits a PPDU through the channel, the STA2 detects that the PPDU of the STA1 is transmitted and the transmission ends on the channel, and then starts transmission after detecting that the channel is idle and waiting a SIFS. Similarly, after the STA2 transmits a PPDU through the channel, the STA2 detects that the PPDU of the STA2 is transmitted and the transmission ends on the channel, and then starts transmitting a PPDU of the STA3 after detecting that the channel is idle and waiting a SIFS. After receiving the PPDU of the last STA3 in the access order, the AP may transmit a frame to end the procedure.

Figure 10:
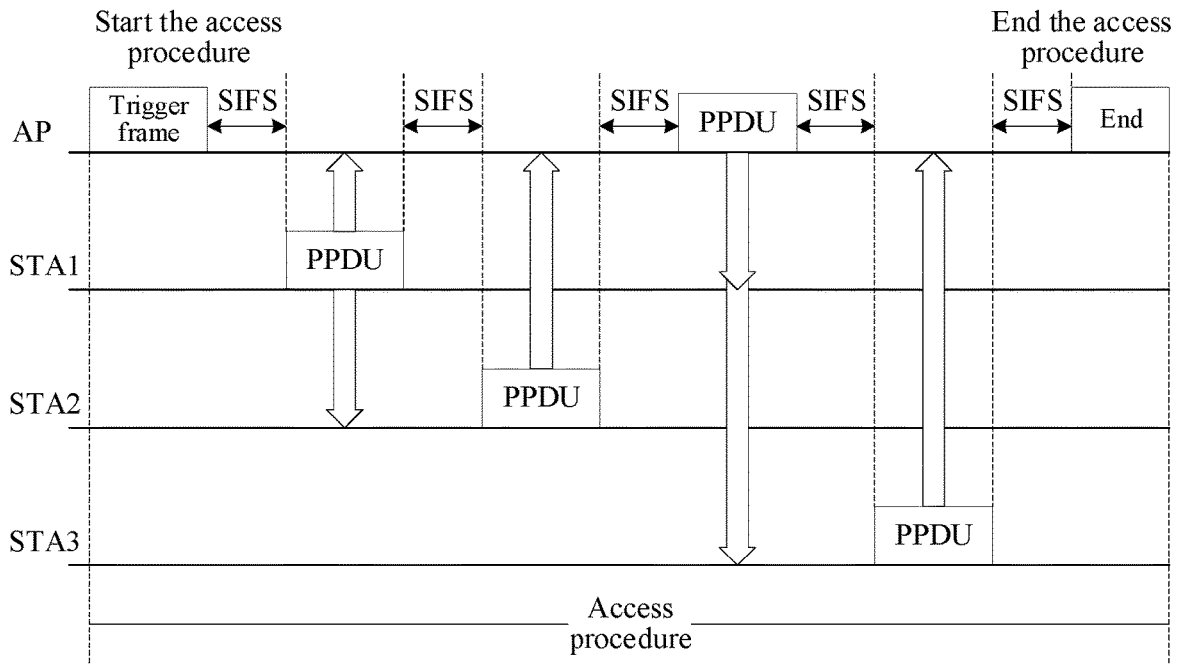
FIG. 10 is a flowchart of a process of group access according to an embodiment of this disclosure.
Figure 11:
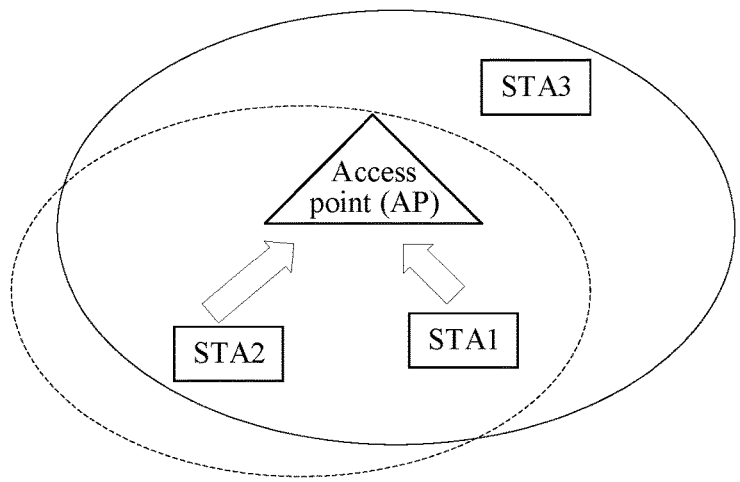
FIG. 11 is a diagram of a scenario in which nodes are hidden nodes of each other according to an embodiment of this disclosure.
Figure 12:
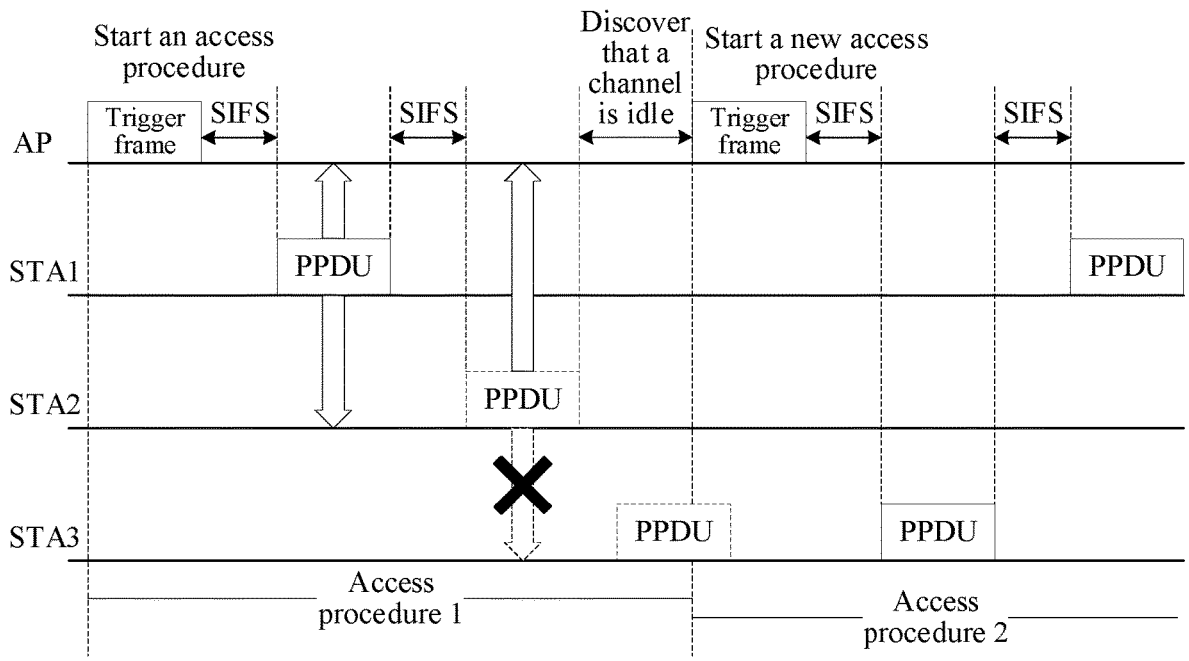
FIG. 12 is a flowchart of a process of group access according to an embodiment of this disclosure.

In an embodiment of this disclosure, the AP may further add the AP as an access STA to the group in the trigger frame. As shown in FIG. 10, the AP initiates a group access procedure by transmitting a trigger frame, and an access order defined in the trigger frame is STA1-STA2-AP-STA3. After the STA1 transmits a PPDU through a channel, the STA2 detects that the PPDU of the STA1 is transmitted and the transmission ends on the channel, and then starts transmitting a PPDU of the STA2 after detecting that the channel is idle and waiting a SIFS. After receiving the PPDU transmitted by the STA2, the AP detects that the channel is idle, and after a SIFS, the AP transmits a PPDU to the STA1. After receiving the PPDU transmitted by the AP, the STA3 detects that the channel is idle, and after a SIFS, starts transmitting a PPDU of the STA3. After receiving the PPDU of the last STA3 in the access order, the AP may transmit a frame to end the procedure. Exemplarily, the AP may appear only at most once in the access order. According to this embodiment of this disclosure, some services may require two-way transmission. For example, after transmitting the PPDU to the AP, the STA1 may need to obtain a downlink ACK or downlink data transmitted by the AP as soon as possible. Adding the AP as an access STA to the group may improve flexibility of the group access procedure and adaptability to different scenarios. In an embodiment of this disclosure, because coverage of 6 GHz is less than that of a conventional Wi-Fi 2.4 GHz frequency band, a problem of a hidden node is severer. As shown in FIG. 11, a STA2 and a STA3 are hidden nodes of each other on 6 GHz, that is, they cannot receive PPDUs transmitted by each other. When an AP initiates a group access procedure shown in FIG. 12, an access order being STA1-STA2-STA3, after the STA2 transmits a PPDU, the STA3 cannot receive the PPDU. In this case, because an access condition of the STA3 is not met, the STA3 keeps listening without transmitting any PPDU. Meanwhile, after the AP receives the PPDU transmitted by the STA2, if no PPDU of the STA3 is received after a period of time (a SIFS), the AP may choose to transmit a frame to end the current access procedure after waiting a period of time (a total waiting time may be a distributed inter-frame spacing (DIFS)). Alternatively, as shown in FIG. 12, the AP transmits a new trigger frame to define a new access group, and start a new access procedure. An access time period defined for the newly initiated access procedure may be less than or equal to a remaining access time period of the previous access procedure. In this way, utilization of an air interface may be improved.

In addition, the AP may detect a network status through the access procedure. For example, the STA2 and the STA3 are hidden nodes of each other. Therefore, in a next access group, the AP may re-plan a STA group, to avoid adding the STA2 and the STA3 to the same group. For example, in an access procedure 2 shown in FIG. 12, the second access procedure initiated by the AP includes only an access order STA3-STA1, and the STA2 is not included in the group.

In an embodiment of this disclosure, transmission of a PPDU of a STA in the access procedure may suffer interference, and the interference may come from a STA in a neighboring basic service set (BSS), or may be other unknown interference. For example, in an interfering case shown in FIG. 13, a STA4 does not receive the trigger frame transmitted by the AP, and therefore, the STA4 also transmits a PPDU while the STA3 transmits the PPDU. As a result, the two PPDUs simultaneously arrive at the AP, between which a collision occurs. After detecting the collision, the AP needs to wait for the channel to be idle, and wait a period of time (for example, an extended inter-frame spacing (EIFS)), to initiate a backoff access mechanism. Specifically, as shown in FIG. 14, a collision occurs between PPDUs transmitted by a STA3 and a STA4 at an AP. After a period of time (an EIFS), the AP may initiate a new access procedure.

Figure 13:
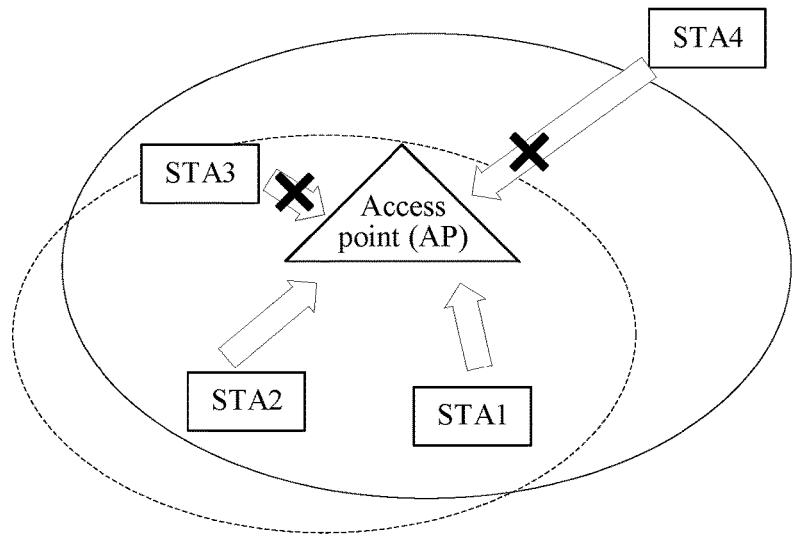
FIG. 13 is a diagram of a scenario in which interference occurs according to an embodiment of this disclosure.
Figure 14:
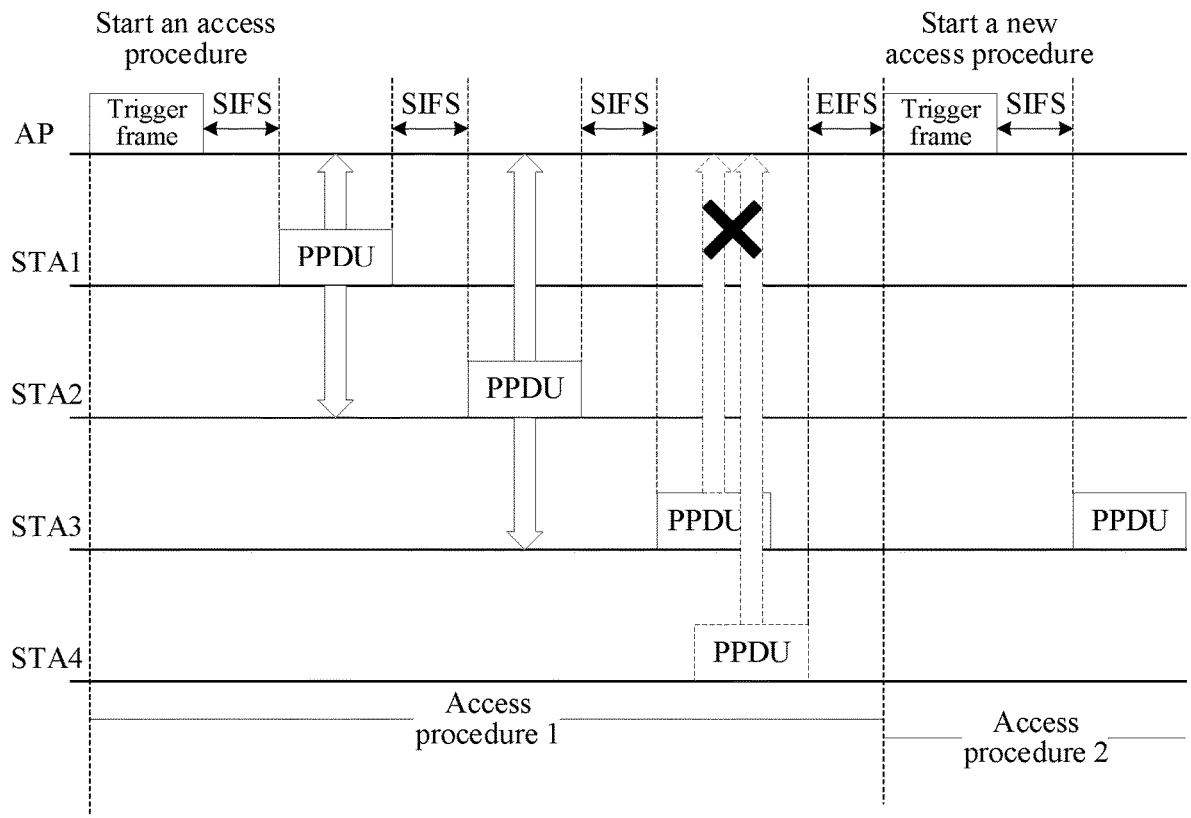
FIG. 14 is a flowchart of a process of group access according to an embodiment of this disclosure.

In the scenario shown in FIG. 13, through the access procedure, the AP may learn that the STA3 currently may be prone to interference. Therefore, group access including the STA4 may not be initiated in a period of time. Moreover, after a period of time, as shown in FIG. 14, when the AP regains channel access by using a backoff mechanism, the AP may re-initiate group access for the STA3. The period of time may include an EIFS starting from completion of the PPDU transmission of the STA3 or the STA4 (the later of the transmission of the STA3 and the transmission of the STA4). Certainly, because the AP may learn, through the access procedure, that the STA3 may be prone to interference, the AP may re-initiate group access including the STA4 on another channel, to avoid interference to the STA3 on the current channel.

Figure 15:
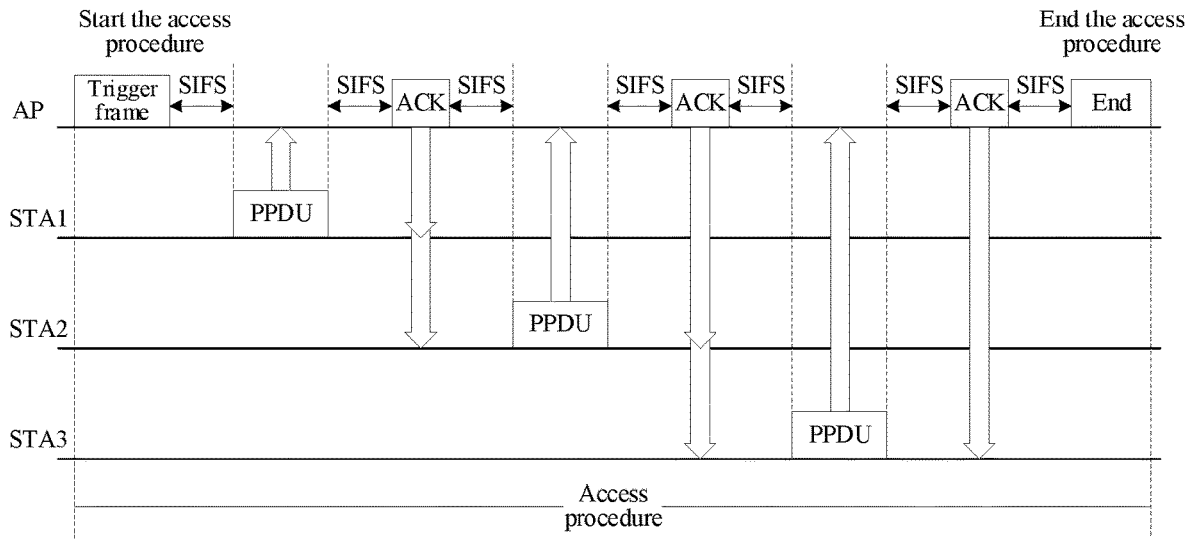
FIG. 15 is a flowchart of a process of group access according to an embodiment of this disclosure.

In an embodiment of this disclosure, if the group access procedure is initiated for a service requiring an ACK reply immediately, the STA in the group needs to perform transmission after detecting ACK information for a PPDU transmitted by a previous STA and detecting that the channel is idle. As shown in FIG. 15, in an access procedure indicated in a trigger frame transmitted by an AP, a PPDU transmitted by a STA is a PPDU requiring an ACK reply immediately. In this case, STAs in a triggered access order (STA1-STA2-STA3) need to set a transmission condition as follows: a channel is idle after the AP transmits an ACK, and an address indicated in the ACK is an address of a previous STA (that is, the ACK transmitted by the AP is acknowledgement information for a PPDU transmitted by the previous STA). Specifically, after the STA1 transmits a PPDU to the AP through the channel, the AP replies with ACK information to the PPDU transmitted by the STA1. The STA2 detects, on the channel, the ACK information transmitted by the AP for the PPDU transmitted by the STA1, and then starts transmitting a PPDU of the STA2 after detecting that the channel is idle and waits a SIFS. After the STA2 transmits the PPDU to the AP through the channel, the AP replies with ACK information for the PPDU transmitted by the STA2. The STA3 detects, on the channel, the ACK information transmitted by the AP for the PPDU transmitted by the STA2, and then starts transmitting a PPDU of the STA3 after detecting that the channel is idle and waits a SIFS. After receiving the PPDU transmitted by the STA3, the AP may reply ACK information, and then may transmit a frame to end the procedure after waiting a SIFS. Based on this embodiment, the wireless communication message frame may further include indication information used for indicating an ACK reply policy, the policy being used for indicating that the AP replies with ACK information to the data frame transmitted by each STA, and before determining whether to start transmitting a data frame, each STA needs to detect ACK information for the data frame transmitted by the previous device.

In an embodiment of this disclosure, the STA group defined in the trigger frame may correspond to a service priority. In this case, a priority corresponding to the PPDU transmitted by each STA may be equal to or greater than the priority corresponding to the group.

Figure 16:
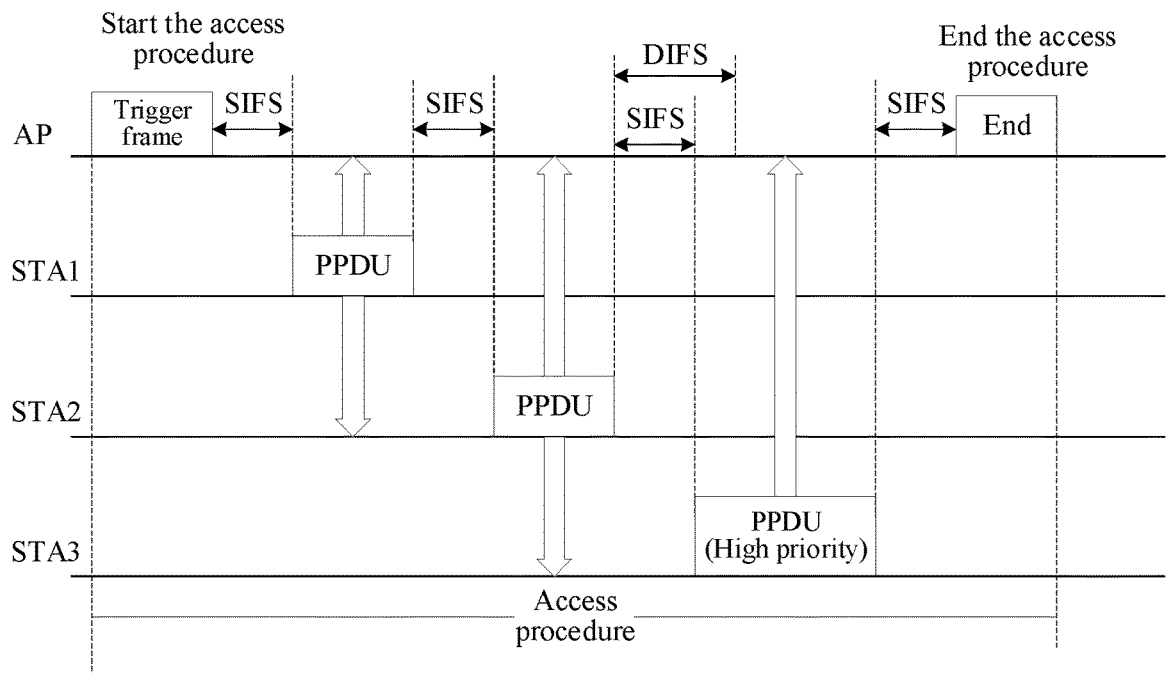
FIG. 16 is a flowchart of a process of group access according to an embodiment of this disclosure.

In another embodiment of this disclosure, a priority corresponding to the PPDU transmitted by each STA in the STA group can be only equal to the priority corresponding to the group. Meanwhile, in the trigger frame, it may be specified whether a current initiated access procedure allows a higher priority service to access in an unauthorized manner. If it is set to allow a higher priority service to access in an unauthorized manner, after the last STA in the access order transmits a PPDU, a STA in another group may immediately transmit a PPDU with a higher priority after waiting a period of time (for example, a SIFS). Specifically, as shown in FIG. 16, after the last STA (that is, a STA2) in a group including a STA1 and the STA2 transmits a PPDU, a STA3 may immediately transmit a PPDU with a higher priority waiting a SIFS.

In an embodiment of this disclosure, if the AP sets the trigger frame to allow a higher priority service to access in an unauthorized manner, after the last STA in the access order transmits a PPDU, the AP may wait a longer time (for example, a DIFS), and if no other STA access in an unauthorized manner to transmit a PPDU with a higher priority, the AP may transmit a frame to end the access procedure. If the AP detects a PPDU with a higher priority transmitted by another STA accessing in an unauthorized manner, the AP may start reception and transmit a frame to end the access procedure after the reception is completed. By receiving the PPDU with the higher priority, the AP may learn that there is a higher priority service requiring access in a current network. Therefore, a STA group with a higher priority may be selected for preferential access in a next procedure.

Figure 17:
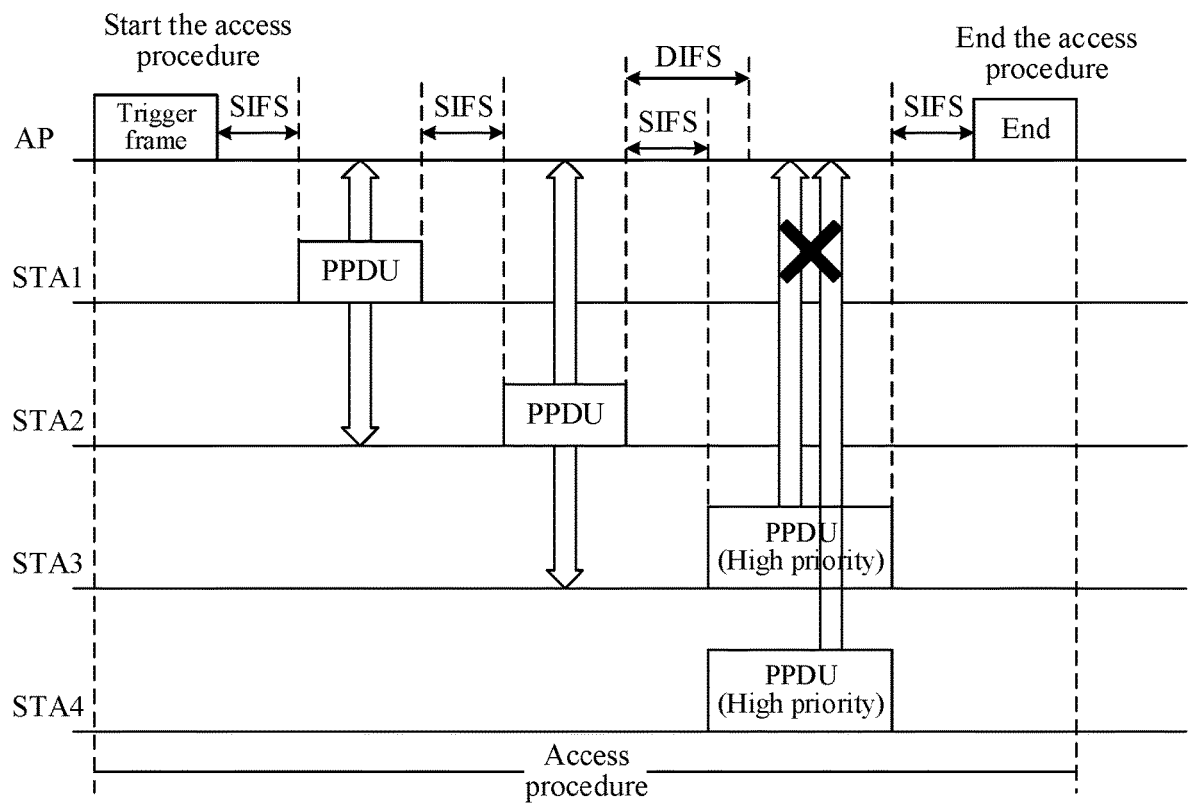
FIG. 17 is a flowchart of a process of group access according to an embodiment of this disclosure.

In an embodiment of this disclosure, if a plurality of STAs in a group all transmit higher priority services after the last STA in a group completes transmission, a collision occurs. Specifically, as shown in FIG. 17, a STA3 and a STA4 both transmit higher priority services to an AP after a STA2 completes transmission. In this case, after detecting a collision, the AP may transmit a frame to end the current access procedure after waiting for the collision to be completed. Through the collision, the AP may learn that there are higher priority services requiring access urgently in a current network. Therefore, a group with a higher priority may be selected for preferential access in a next procedure.

In this embodiment of this disclosure, the access order of the STAs in the STA group is determined, so that the STAs may sequentially access the channel according to a rule to transmit PPDUs, thereby reducing air interface contention and overheads of signaling exchange. Meanwhile, in this embodiment of this disclosure, because a higher priority service may be allowed to access in an unauthorized manner, transmission of the higher priority service may be guaranteed to some extent, and the AP can learn transmission requirements of the high priority service in a network in time to adapt to network changes more quickly and perform access scheduling more efficiently.

In the foregoing embodiments, the 6 GHz frequency band is used as an example to illustrate the embodiments of this disclosure. In other embodiments of this disclosure, the technical solutions of the embodiments of this disclosure may also be applied to other frequency bands, for example, a 5 GHz frequency band, to implement more efficient access control.

The following describes apparatus embodiments of this disclosure, which may be used for performing the communication methods in the foregoing embodiments of this disclosure. For details not disclosed in the apparatus embodiments of this disclosure, reference may be made to the foregoing communication method embodiments of this disclosure.

Figure 18:
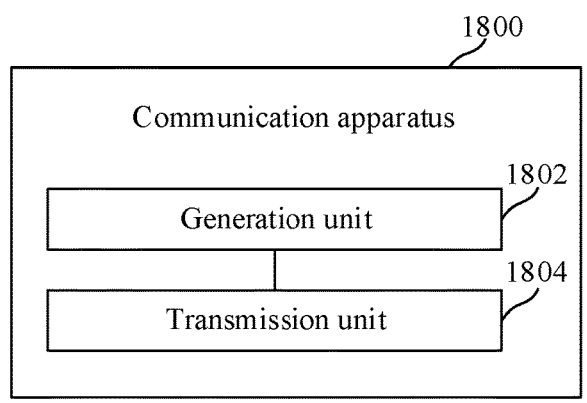
FIG. 18 is a block diagram of a communication apparatus according to an embodiment of this disclosure.

FIG. 18 is a block diagram of a communication apparatus according to an embodiment of this disclosure. The communication apparatus may be disposed in an AP device.

Referring to FIG. 18, a communication apparatus 1800 according to an embodiment of this disclosure includes: a generation unit 1802 and a transmission unit 1804.

The generation unit 1802 is configured to generate a wireless communication message frame, the wireless communication message frame including information about devices in a queue to access a channel, and an access order of the devices. The transmission unit 1804 is configured to transmit, when information about an available transmission channel is obtained, the wireless communication message frame to start a data transmission procedure and instruct the devices to sequentially transmit communication data through the transmission channel according to the access order in the data transmission procedure.

In some embodiments of this disclosure, based on the foregoing solutions, a frame body portion of the wireless communication message frame includes the information about the devices, and an arrangement order of the information about the devices in the frame body portion is used for representing the access order of the devices; or a frame header part of the wireless communication message frame includes the information about the devices and information about the access order of the devices.

In some embodiments of this disclosure, based on the foregoing solutions, the communication apparatus 1800 further includes: an obtaining unit, configured to obtain the information about the available transmission channel through channel contention; or configured to perform communication negotiation with another AP device, to obtain the information about the available transmission channel.

In some embodiments of this disclosure, based on the foregoing solutions, the transmission unit 1804 is further configured to transmit a message frame for ending the data transmission procedure in a case of detecting that data transmission of the last device in the access order is completed.

In some embodiments of this disclosure, based on the foregoing solutions, the transmission unit 1804 is further configured to transmit a message frame for ending the data transmission procedure within a transmission time of a target device included in the wireless communication message frame if no communication data transmitted by the target device is detected in a first preset time period, the first preset time period starting after communication data transmission of a previous device of the target device in the access order is completed.

In some embodiments of this disclosure, based on the foregoing solutions, the generation unit 1802 is further configured to generate a new wireless communication message frame after the transmission unit 1804 transmits the message frame for ending the data transmission procedure, a data transmission time period indicated in the new wireless communication message frame being less than or equal to a remaining transmission time period of the data transmission procedure.

In some embodiments of this disclosure, based on the foregoing solutions, the communication apparatus 1800 further includes: a determining unit, configured to determine, according to data transmission statuses of the devices, whether there is a hidden node of a target device in the devices; the generation unit 1802 being further configured to add the target device and the hidden node to different wireless communication message frames during subsequent wireless communication message frame generation if there is the hidden node of the target device.

In some embodiments of this disclosure, based on the foregoing solutions, the communication apparatus 1800 further includes: a processing unit, configured to skip, in a case of detecting that there is interference between communication data transmitted by a first device and a second device, starting a data transmission procedure including the second device or the first device in a second preset time period, the second preset time period starting after the later of data transmission of the first device and data transmission of the second device is completed; or configured to start, in a case of detecting that there is interference between communication data transmitted by a first device and a second device, a data transmission procedure for the second device on another transmission channel different from a transmission channel of the first device.

In some embodiments of this disclosure, based on the foregoing solutions, the wireless communication message frame further includes first indication information, the first indication information being used for indicating that priorities of data frames transmitted by the devices in the data transmission procedure are greater or equal to a specified priority.

In some embodiments of this disclosure, based on the foregoing solutions, the wireless communication message frame further includes second indication information and third indication information, the second indication information being used for indicating that priorities of data frames transmitted by the devices in the data transmission procedure are equal to a specified priority, and the third indication information being used for indicating whether service data higher than the specified priority is allowed to be transmitted in the data transmission procedure.

If the third indication information indicates that target service data higher than the specified priority is allowed to be transmitted in the data transmission procedure, the target service data is allowed to be transmitted on the transmission channel after data transmission of the last device in the access order is completed.

In some embodiments of this disclosure, based on the foregoing solutions, the transmission unit 1804 (or transmitter) is further configured to transmit a message frame for ending the data transmission procedure in a case of detecting that transmission of the target service data is completed on the transmission channel; or configured to transmit a message frame for ending the data transmission procedure if the third indication information indicates that the target service data higher than the specified priority is allowed to be transmitted in the data transmission procedure but the target service data is not received in a third preset time period after the data transmission of the last device is completed.

In some embodiments of this disclosure, based on the foregoing solutions, the transmission unit 1804 is further configured to transmit a message frame for ending the data transmission procedure if the third indication information indicates that the target service data higher than the specified priority is allowed to be transmitted in the data transmission procedure but target service data transmitted by a plurality of other devices on the transmission channel is detected after the data transmission of the last device is completed.

In some embodiments of this disclosure, based on the foregoing solutions, the wireless communication message frame further includes any one or a combination of the following information: a maximum time period of the data transmission procedure and fourth indication information used for indicating an MCS adopted in data transmission.

Figure 19:
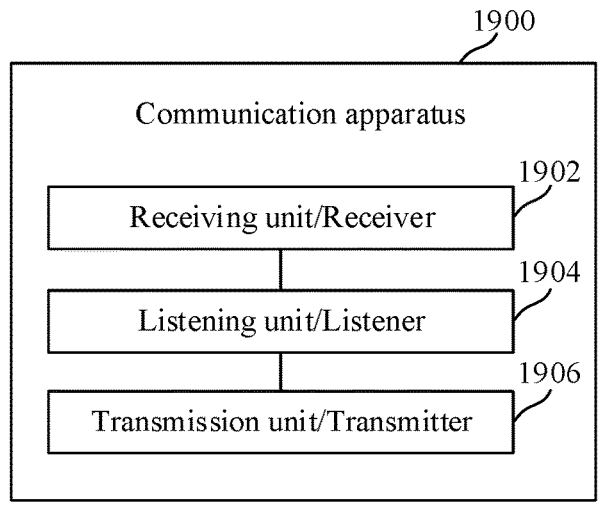
FIG. 19 is a block diagram of a communication apparatus according to an embodiment of this disclosure.

FIG. 19 is a block diagram of a communication apparatus according to an embodiment of this disclosure. The communication apparatus may be disposed in a STA device.

Referring to FIG. 19, a communication apparatus 1900 according to an embodiment of this disclosure includes: a receiving unit 1902 (or receiver), a listening unit 1904 (or listener), and a transmission unit 1906 (transmitter).

The receiving unit 1902 is configured to receive a wireless communication message frame, the wireless communication message frame including information about devices in a queue to access a specified transmission channel, and an access order of the devices. The listening unit 1904 is configured to listen on the specified transmission channel if the wireless communication message frame includes information about a specified device. The transmission unit 1906 is configured to transmit, by the specified device, communication data through the specified transmission channel in a case of detecting, on the specified transmission channel, that data transmission of a previous device of the specified device in the access order is completed and detecting that the specified transmission channel is idle.

In some embodiments of this disclosure, based on the foregoing solutions, the transmission unit 1906 is further configured to determine, if a data frame transmitted by the previous device is detected on the specified transmission channel, that the data transmission of the previous device is completed; or configured to determine, if reception acknowledgement information for the data frame transmitted by the previous device is detected on the specified transmission channel, that the data transmission of the previous device is completed.

The term module (and other similar terms such as unit, submodule, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 20:
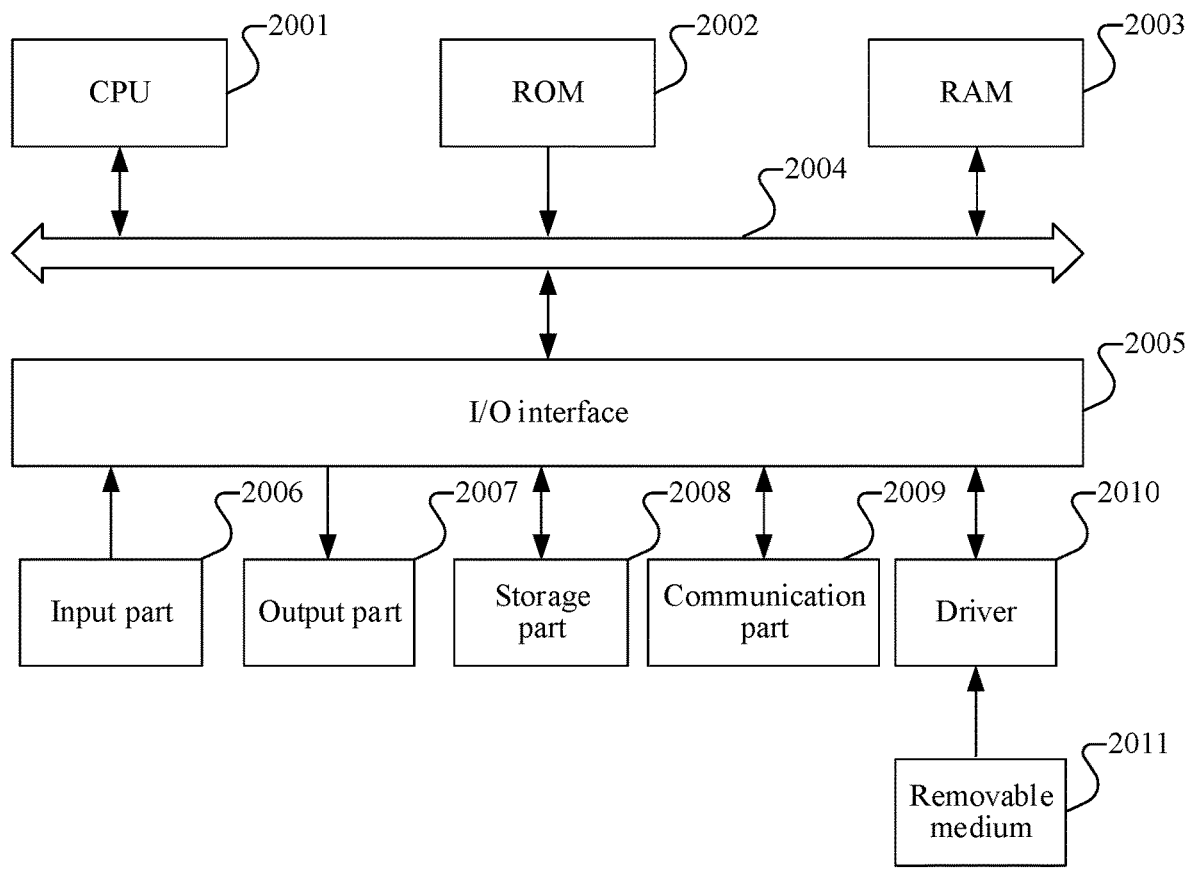
FIG. 20 is a schematic structural diagram of a computer system adapted to implement an electronic device according to an embodiment of this disclosure.

FIG. 20 is a schematic structural diagram of a computer system adapted to implement an electronic device according to an embodiment of this disclosure.

The computer system 2000 of the electronic device shown in FIG. 20 is merely an example, and does not constitute any limitation on functions and use ranges of the embodiments of this disclosure.

As shown in FIG. 20, the computer system 2000 includes a central processing unit (CPU) 2001, which may perform various suitable actions and processing based on a program stored in a read-only memory (ROM) 2002 or a program loaded from a storage part 2008 into a random access memory (RAM) 2003, for example, perform the method described in the foregoing embodiments. The RAM 2003 further stores various programs and data required for system operations. The CPU 2001, the ROM 2002, and the RAM 2003 are connected to each other through a bus 2004. An input/output (I/O) interface 2005 is also connected to the bus 2004.

The following components are connected to the I/O interface 2005: an input part 2006 including a keyboard, a mouse, or the like, an output part 2007 including a cathode ray tube (CRT), a liquid crystal display (LCD), a speaker, or the like, a storage part 2008 including a hard disk, or the like, and a communication part 2009 including a network interface card such as a LAN card or a modem. The communication part 2009 performs communication processing through a network such as the Internet. A driver 2010 is also connected to the I/O interface 2005 as required. A removable medium 2011, such as a magnetic disk, an optical disc, a magneto-optical disk, or a semiconductor memory, is installed on the driver 2010 as required, so that a computer program read from the removable medium is installed into the storage part 2008 as required.

Particularly, according to an embodiment of this disclosure, the processes described in the following by referring to the flowcharts may be implemented as computer software programs. For example, an embodiment of this disclosure includes a computer program product. The computer program product includes a computer program stored in a computer-readable medium. The computer program includes a computer program used for performing a method shown in the flowchart. In such an embodiment, the computer program may be downloaded and installed from the network through the communication portion 2009, and/or installed from the removable medium 2011. When the computer program is executed by the CPU 2001, the various functions defined in the system of this application are executed.

The computer-readable medium shown in the embodiments of this disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, apparatus, or device. In this application, the computer-readable signal medium may include a data signal transmitted in a baseband or as part of a carrier, and stores a computer-readable computer program. The data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments of this disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Related units described in the embodiments of this disclosure may be implemented in a software manner, or may be implemented in a hardware manner, and the unit described can also be set in a processor. Names of the units do not constitute a limitation on the units in a specific case.

According to another aspect, this application further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of this application, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solutions of the embodiments of this disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this disclosure.

After considering the specification and practicing the disclosed embodiments, a person skilled in the art may easily conceive of other implementations of this application. This application is intended to cover any variations, uses, or adaptive changes of this application following the general principles of this application, and includes well-known knowledge and conventional technical means in the art and undisclosed in this application.

It is to be understood that this application is not limited to the precise structures described above and shown in the accompanying drawings, and various modifications and changes may be made without departing from the scope of this application. The scope of this application is subject only to the appended claims.

What is claimed is:

1. A communication method, performed by an electronic device, the method comprising:
generating a wireless communication message frame, the wireless communication message frame comprising information about devices in a queue to access a transmission channel, and an access order of the devices;
transmitting, when information about an available transmission channel is obtained, the wireless communication message frame to start a data transmission procedure and instructing the devices to sequentially transmit communication data through the transmission channel according to the access order in the data transmission procedure; and
transmitting a message frame for ending the data transmission procedure within a transmission time of a target device comprised in the wireless communication message frame if no communication data transmitted by the target device is detected in a first preset time period, the first preset time period starting after communication data transmission of a previous device of the target device in the access order is completed.

2. The communication method according to claim 1, wherein a frame body portion of the wireless communication message frame comprises the information about the devices, and an order of the information about the devices in the frame body portion is used for representing the access order of the devices.

3. The method of claim 1, wherein a frame header of the wireless communication message frame comprises the information about the devices and information about the access order of the devices.

4. The communication method according to claim 1, further comprising:
obtaining the information about the available transmission channel by channel contention or by performing communication negotiation with another access point (AP) device.

5. The communication method according to claim 1, further comprising:
transmitting a message frame for ending the data transmission procedure when detecting that data transmission of the last device in the access order is completed.

6. The communication method according to claim 1, further comprising:
after transmitting the message frame for ending the data transmission procedure, generating a new wireless communication message frame, a data transmission time period indicated in the new wireless communication message frame being less than or equal to a remaining transmission time period of the data transmission procedure.

7. The communication method according to claim 1, further comprising:
determining, according to data transmission statuses of the devices, whether there is a hidden node of a target device in the devices; and
adding the target device and the hidden node to different wireless communication message frames during subsequent wireless communication message frame generation when there is the hidden node of the target device.

8. The communication method according to claim 1, further comprising:
skipping, when detecting that there is interference between communication data transmitted by a first device and a second device, starting a data transmission procedure comprising the second device or the first device in a second preset time period, the second preset time period starting after the later of data transmission of the first device and data transmission of the second device is completed; or
starting, when detecting that there is interference between communication data transmitted by the first device and the second device, a data transmission procedure for the second device on another transmission channel different from a transmission channel of the first device.

9. The communication method according to claim 1, wherein the wireless communication message frame further comprises first indication information, the first indication information being used for indicating that priorities of data frames transmitted by the devices in the data transmission procedure are greater or equal to a specified priority.

10. The communication method according to claim 1, wherein the wireless communication message frame further comprises second indication information and third indication information, the second indication information being used for indicating that priorities of data frames transmitted by the devices in the data transmission procedure are equal to a specified priority, and the third indication information being used for indicating whether service data higher than the specified priority is allowed to be transmitted in the data transmission procedure, wherein
if the third indication information indicates that target service data higher than the specified priority is allowed to be transmitted in the data transmission procedure, the method further comprising allowing the target service data to be transmitted on the transmission channel after data transmission of the last device in the access order is completed.

11. The communication method according to claim 10, further comprising:
transmitting a message frame for ending the data transmission procedure when detecting that transmission of the target service data is completed on the transmission channel; or
transmitting a message frame for ending the data transmission procedure if the third indication information indicates that the target service data higher than the specified priority is allowed to be transmitted in the data transmission procedure but the target service data is not received in a third preset time period after the data transmission of the last device is completed.

12. The communication method according to claim 10, further comprising:
transmitting a message frame for ending the data transmission procedure if the third indication information indicates that the target service data higher than the specified priority is allowed to be transmitted in the data transmission procedure but target service data transmitted by a plurality of other devices on the transmission channel is detected after the data transmission of the last device is completed.

13. The communication method according to claim 1, wherein the wireless communication message frame further comprises at least one of:
a maximum time period of the data transmission procedure; or fourth indication information used for indicating a modulation and coding scheme (MCS) adopted in data transmission.

14. A communication method, performed by an electronic device, the method comprising:
   receiving a wireless communication message frame, the wireless communication message frame comprising information about devices in a queue to access a specified transmission channel, an access order of the devices, first indication information, and second indication information, the first indication information being used for indicating that priorities of data frames transmitted by the devices in the data transmission procedure are equal to a specified priority, and the second indication information being used for indicating whether service data higher than the specified priority is allowed to be transmitted in the data transmission procedure;
   listening on the specified transmission channel if the wireless communication message frame comprises information about a specified device; and
   transmitting, by the specified device, communication data through the specified transmission channel when detecting, on the specified transmission channel, that data transmission of a previous device of the specified device in the access order is completed and detecting that the specified transmission channel is idle.

15. The communication method according to claim 14, further comprising:
   determining that the data transmission of the previous device is completed according to whether a data frame transmitted by the previous device is detected on the specified transmission channel or whether reception acknowledgement information for the data frame transmitted by the previous device is detected on the specified transmission channel.

16. A communication apparatus, comprising:
   a receiver, configured to receive a wireless communication message frame, the wireless communication message frame comprising information about devices in a queue to access a specified transmission channel, an access order of the devices, first indication information, and second indication information, the first indication information being used for indicating that priorities of data frames transmitted by the devices in the data transmission procedure are equal to a specified priority, and the second indication information being used for indicating whether service data higher than the specified priority is allowed to be transmitted in the data transmission procedure;
   a listener, configured to listen on the specified transmission channel if the wireless communication message frame comprises information about a specified device; and
   a transmitter, configured to transmit, by the specified device, communication data through the specified transmission channel in a case of detecting, on the specified transmission channel, that data transmission of a previous device of the specified device in the access order is completed and detecting that the specified transmission channel is idle.

17. A non-transitory computer-readable medium, storing a computer program, the computer program, when executed by at least one processor, implementing the communication method of claim 1.

18. An electronic device, comprising:
   one or more processors; and
   a storage apparatus, configured to store one or more programs, the one or more programs, when executed by the one or more processors, causing the one or more processors to implement the communication method of claim 1.

19. An electronic device, comprising:
   one or more processors; and
   a storage apparatus, configured to store one or more programs, the one or more programs, when executed by the one or more processors, causing the one or more processors to implement the communication method of claim 14.

* * * * *